M. CALHOUN.
Nut-Lock.

No. 197,762. Patented Dec. 4, 1877.

WITNESSES:
A. W. Almqvist
J. H. Scarborough

INVENTOR:
M. Calhoun.
BY Munn & Co.
ATTORNEYS.

UNITED STATES PATENT OFFICE.

MADISON CALHOUN, OF OCATE, NEW MEXICO TERRITORY.

IMPROVEMENT IN NUT-LOCKS.

Specification forming part of Letters Patent No. 197,762, dated December 4, 1877; application filed October 6, 1877.

*To all whom it may concern:*

Figure 1:
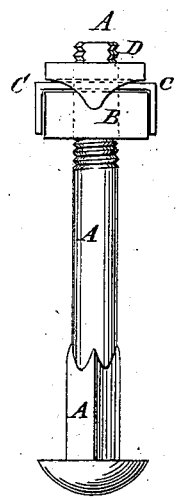
Figure 2:
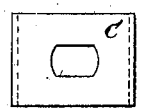
Figure 3:
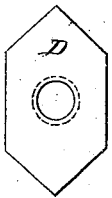

Be it known that I, MADISON CALHOUN, of Ocate, in the county of Mora and Territory of New Mexico, have invented a new and useful Improvement in Nut-Lock, of which the following is a specification:

Figure 1 is a side view of my improved nut-lock, shown as applied to a nut and bolt. Fig. 2 is a detail top view of the inner part of the lock. Fig. 3 is a detail top view of the outer part of the lock.

Similar letters of reference indicate corresponding parts.

The object of this invention is to furnish an improved nut-lock, simple in construction, convenient in use, and effective in operation, holding the nut securely in place however much the rail or machine to which the bolt is applied may be jarred.

The invention consists in the combination of the plate, having its ends bent down and an oblong hole formed through its center, and the plate having a screw-hole formed through its center, and provided with points susceptible of being bent down with the nut and the flattened end of the bolt, as hereinafter fully described.

A represents a bolt, and B represents its nut. The end part of the bolt, upon which the screw-thread is formed, is flattened, as shown in Fig. 1.

C is a plate, the ends of which are bent downward at right angles, so as to overlap and fit upon the opposite side edges of the nut B. The plate C has a hole formed through its center, which is made oblong, so as to fit upon the flattened end of the bolt A, so that it cannot turn upon said bolt, and will thus prevent the nut B from turning. D is a plate of soft and very tough iron or other material, which may be bent a great many times without breaking, and which has a screw-hole formed through its center, so that it may be screwed upon the end of the bolt A.

The ends of the plate D, or points $d'$, formed upon said ends, are then bent down, so as to overlap the sides of the plate C and nut B. The plate C prevents the nut B and the plate D from turning, and the plate D prevents the plate C from slipping off the bolt A, thus forming a simple and reliable lock.

Having thus described my invention, I claim as new and desire to secure by Letters Patent—

The combination of the plate C, having its ends bent down and an oblong hole formed through its center, and the plate D, having a screw-hole formed through its center, and provided with points $d'$ susceptible of being bent down with the nut B and the flattened end of the bolt A, substantially as herein shown and described.

MADISON CALHOUN.

Witnesses:
M. BLOOMFIELD,
P. J. McCLURE.